July 7, 1970     R. J. PORTER     3,518,738

MICROMETER ADJUSTMENT FOR CUTTING TOOLS

Filed Feb. 6, 1968

INVENTOR.
RAYMOND J. PORTER
BY
*Meyer, Tilberry & Body*
ATTORNEYS.

United States Patent Office 3,518,738
Patented July 7, 1970

3,518,738
MICROMETER ADJUSTMENT FOR CUTTING TOOLS
Raymond J. Porter, Panania, New South Wales, Australia, assignor, by mesne assignments, to Gulf + Western Industrial Products Company, Grand Rapids, Mich., a corporation of Delaware
Filed Feb. 6, 1968, Ser. No. 703,338
Int. Cl. B23d 1/00
U.S. Cl. 29—96                                    2 Claims

ABSTRACT OF THE DISCLOSURE

There is provided a cutting tool having an adjustable cutting element which is positioned by an adjustment means, wherein the adjustment means includes a shaft having two threaded portions of unequal pitch.

---

This invention pertains to the art of cutting tools and more particularly to cutting tools which have an adjustable cutting element.

The present invention is particularly applicable for use in machining operations, such as grinding or turning the surface of a workpiece on a lathe; however, it will be appreciated that the invention has somewhat broader applications, and it may be used in any machining application where accurate adjustment of a cutting element is necessary.

Cutting tools known heretofore have included an adjustable cutting element; however, these tools are not capable of very fine or extremely accurate adjustment. These known, adjustable cutting tools normally include a cutting element wherein the element is supported by a holder and is slidably adjustable with respect to the holder. Either the cutting element is moved manually to the desired position and tightened in place with a set screw, or the element is adjusted by turning an adjustment screw which is threadably engaged with the holder. The adjustment screw in turn exerted a force against the cutting element to thereby move the element into the desired position. The latter arrangement employed a spring device for applying an opposite force against the element to return it as the adjustment screw was withdrawn. It was found that the fine adjustments of the cutting element that were necessary to produce a surface of exacting tolerance generally could not be obtained with these prior arrangements for adjustment of the cutting element. In addition and more importantly, considerable effort and time was required to return the cutting element to a desired preselected position with respect to the holder.

These disadvantages, and others, such as the limited range of adjustment of prior adjustable cutting tools are completely overcome by the present invention which is directed toward a novel micrometer adjustment for the cutting element.

In accordance with the present invention, there is provided a tool holder having a passage extending in a generally transverse direction therethrough for supporting an adjustable cutting element. The cutting element is reciprocally received within the passage. An adjustment structure is operatively engaged in the passage to provide movement of the adjustment structure with respect to the holder. In addition a means is provided between the adjustment structure and the cutting element for moving the cutting element in the passage a distance of travel different from that of the adjustment structure with respect to the holder.

The primary object of the present invention is the provision of a cutting element in combination with a rotatable adjustment shaft having two sets of threads of a different pitch, which provides a very fine adjustment of the cutting element.

Another object of the present invention is the provision of a cutting element in combination with a rotatable adjustment shaft having two sets of threads of a different pitch which provides a very accurate means of adjusting the cutting element.

Still another object of the present invention is the provision of a cutting element in combination with a rotatable adjustment shaft having two sets of threads of a different pitch, which provides a large range of adjustment for the cutting element.

Yet another object of the present invention is the provision of a cutting element in combination with a rotatable adjustment shaft having two sets of threads of a different pitch which combination is easily installed in conventional cutting tool holders.

Yet another object of the present invention is the provision of an adjustable cutting tool which dispenses with springs or other similar devices.

These and other objects and advantages will become apparent from the following description used to illustrate the preferred embodiment of the invention as read in connection with the accompanying drawing in which.

Figure 1:
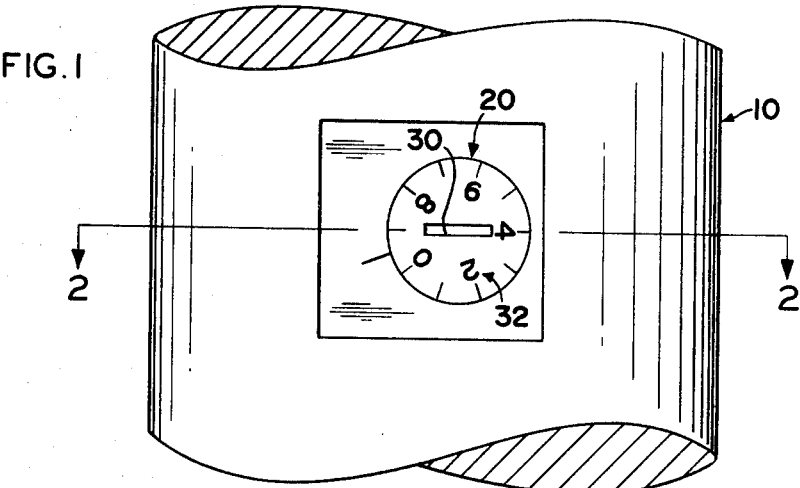
FIG. 1 is a side elevational view of a micrometer adjustment cutting tool illustrating the preferred embodiment of the present invention.
Figure 2:
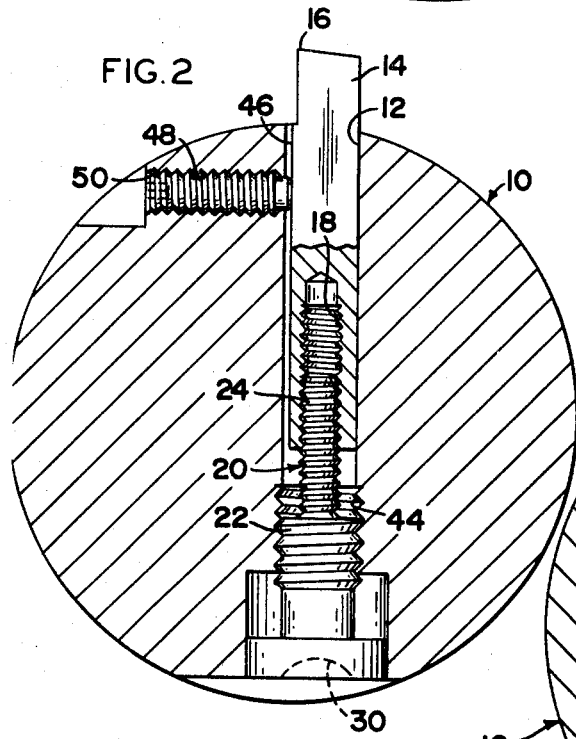
FIG. 2 is a cross-sectional view taken generally along line 2—2 of FIG. 1.

Referring now to the drawings wherein the showings are for the purpose of illustrating a preferred embodiment of the invention only and not for the purpose of limiting same, FIGS. 1 and 2 show a tool holder member 10, such as a solid cylindrical shaft, which has a passage 12 extending in a generally transverse direction therethrough. Slidably mounted within the passage 12 is a cutting element 14 having a cutting surface 16, and including a threaded bore 18 to receive the adjustment shaft 20. The adjustment structure 20 retains and positions the cutting element 14 with respect to the holder 10.

Figure 4:
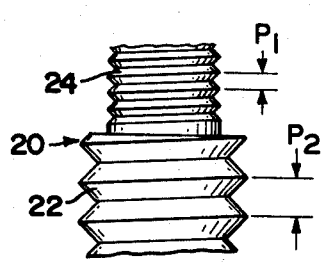
FIG. 4 is a somewhat exaggerated view of the adjustment shaft of FIGS. 2 and 3 illustrating the difference in pitch of the threaded portions.

Referring now in more detail to the adjustment structure 20, this shaft is cylindrical in form and has a first portion 22 and a second portion 24 which preferably has a smaller diameter than the first portion, both portions being at least partially threaded. As indicated in FIG. 4, the threads on portion 22 of the adjustable shaft 20 have a pitch $P_2$ which is greater than the pitch $P_1$ of the threads on portion 24. The adjustable screw 20 is further provided with a groove or slot 30 for receiving a tool such as a screwdriver for the fine adjustment of the cutting element 14. Dial-type graduations 32 are provided on the end of the shaft 20 so that the cutting element 14 can be accurately adjusted or returned to a preselected position.

In accordance with one embodiment of the present invention, the threaded portions 22 and 24 are threadably engaged with the end 44 of the passage 12 and the bore 18 of the cutting element, respectively. One side 46 of the cutting element 14 is somewhat flattened so that the locking screw 48, upon being tightened in the passage 50, prevents both longitudinal and rotary movement of the cutting element 14.

To adjust the cutting element 14, coarse adjustment of the element is achieved by slackening locking screw 48 until the cutting element is free to rotate. The cutting element 14 is then rotated on the adjustment shaft 20 until the cutting element is approximately adjusted to the desired position. Locking screw 48 is then tightened against the flattened surface 46 only enough to prevent rotation of the cutting element 14, but still allowing sliding or translational movement of the element. Final adjustment is achieved by rotating the adjustment shaft 20 with a tool such as a screwdriver inserted in slot 30, noting the amount of movement by the graduations 32 on the dial at the end of the shaft, until the cutting element 14 is in the desired position. Finally, the locking screw 48 is secured against the flattened surface 46 of the cutting element 14 to prevent any further sliding movement of the cutting element.

In accordance with the preferred embodiment of this invention, the two sets of threads on the adjustment shaft are the same "hand"; however, these threads are of a different pitch as can be seen in FIG. 4. During the final adjustment, as the first portion 22 of the adjustment shaft 20 is turned into the passage 12 at the end 44, the second portion of the adjustment structure turns into the bore 18, thereby causing the cutting element to travel only a distance equal to the length of pitch $P_2$ minus the length of pitch $P_1$. As can readily be seen, as the pitch $P_2$ approaches that of pitch $P_1$, the adjustment of the cutting element 14 becomes extremely fine, i.e., several turns of the adjustment shaft 20 produces a very small distance of travel of the cutting element.

Figure 3:
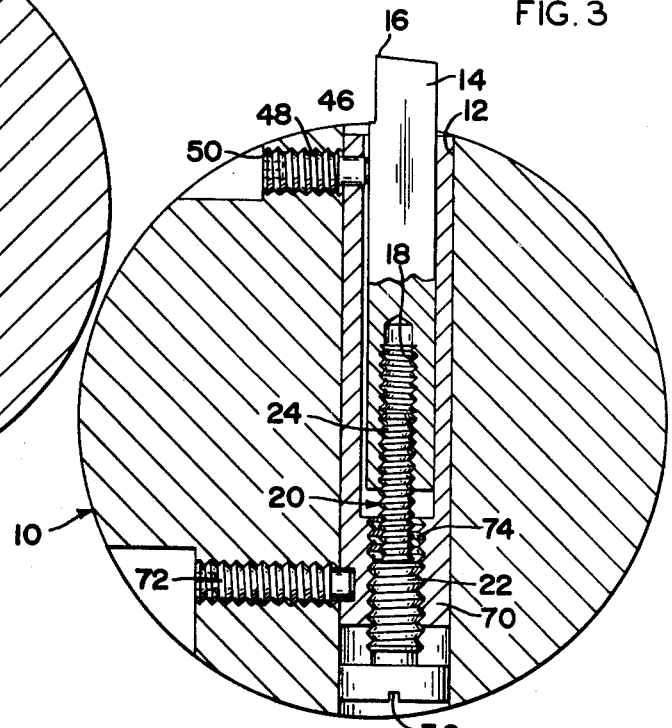
FIG. 3 is a cross-sectional view illustrating a modification of the preferred embodiment illustrated in FIG. 2.

Referring now to FIG. 3, a modification of the preferred embodiment of the present invention is disclosed wherein a removable sleeve 70 having a cylindrical inside surface is mounted in passage 12 of the holder 10, and is secured in position by the locking screw 72. The inside surface or passage of sleeve 70 includes threads 74 at one end which threadably engage with the first portion 22 of the adjustment shaft 20. It will be appreciated that this embodiment of the micrometer adjustment cutting tool can be readily installed with various conventional tool holders.

It is to be appreciated that the present invention provides an adjustable cutting tool wherein a very fine and extremely accurate adjustment may be obtained over a very broad range of adjustment.

The present invention has been discussed in connection with certain structural embodiments; however, various modifications may be made in these embodiments without departing from the intended spirit and scope of the present invention as defined by the appended claims.

What is claimed is:
1. An adjustable cutting tool comprising a holder having means forming a first passage extending in a generally transverse direction therethrough and having a longitudinal axis; a second passage in a generally transverse direction therethrough having a longitudinal axis, normal to said first passage and intersecting it such that the longitudinal axis of said second passage intersects the longitudinal axis of said first passage at generally a right angle; a cutting element slidably received in said first passage; said first passage having a given minimum transverse dimension, said cutting element being generally elongated and having an internal axially extended threaded recess and a maximum transverse dimension substantially less than said minimum dimension whereby said cutter may be rotated in said first passage; an adjustment element with a first threaded portion threadably engaging said first passage and movable with respect to said holder upon rotation with respect thereto and a second threaded portion threadably received in said threaded recess of said cutting element whereby rotation of said cutting element adjusts the axial position thereof with respect to said first passage; and a locking element threadably received in said second passage, said locking element having first, second and third distinct operative positions within said second passage, wherein in said first position, said locking element being remote from said cutting element a distance more than one-half the difference between said minimum and maximum dimensions, in said second position, said locking element being remote from said cutting element a distance less than one-half the difference in said minimum and maximum dimensions and in said third position said locking element being clamped against said cutting element to lock the same with respect to said first passage.

2. The cutting tool as defined in claim 1 wherein said means comprises a hollow cylindrical sleeve with a first peripheral opening extending through the sleeve at a position aligned with said locking element and a second peripheral recess in said sleeve, and a sleeve retaining element in said holder and extending into said recess for securing said sleeve within said first passage.

References Cited

UNITED STATES PATENTS

| | | | |
|---|---|---|---|
| 2,125,005 | 7/1938 | Jearum | 29—96 |
| 2,359,210 | 9/1944 | Engel | 77—58 |
| 2,359,957 | 10/1944 | Zempel | 77—58 |
| 2,553,761 | 5/1951 | Gooding | 29—96 |
| 3,005,365 | 10/1961 | Billman | 77—58 |

HARRISON L. HINSON, Primary Examiner

U.S. Cl. X.R.

77—58